United States Patent [19]

Hedlund et al.

[11] Patent Number: 4,868,478
[45] Date of Patent: Sep. 19, 1989

[54] MOTOR ENERGIZING CIRCUIT

[75] Inventors: Gunnar Hedlund; Henrik Lundberg, both of Stockholm, Sweden

[73] Assignee: EMS Electronic Motor Systems AB, Stockholm, Sweden

[21] Appl. No.: 205,394
[22] PCT Filed: Oct. 1, 1987
[86] PCT No.: PCT/SE87/00443
  § 371 Date: Jun. 8, 1988
  § 102(e) Date: Jun. 8, 1988
[87] PCT Pub. No.: WO88/02952
  PCT Pub. Date: Apr. 21, 1988

[30] Foreign Application Priority Data
  Oct. 10, 1986 [SE] Sweden .................. 8604308

[51] Int. Cl.$^4$ ............................ H02P 8/00
[52] U.S. Cl. ............... 318/696; 318/685; 318/701
[58] Field of Search ............ 318/696, 685, 701

[56] References Cited
U.S. PATENT DOCUMENTS
  4,611,157 9/1986 Miller et al. ............ 318/696

OTHER PUBLICATIONS
"Inverter Drive for Switched Reluctance Motor: Circuits and Component Ratings", IEE Proc., vol. 128, No. 2, Mar. 1981, by R. M. Davis et al., pp. 126–136.
"Waveform Sensing Closes the Loop in Step Motor Control", Production Engineering, Feb. 1977, by J. R. Frus et al., pp. 47–49.

Primary Examiner—William M. Shoop, Jr.
Assistant Examiner—Saul M. Bergmann
Attorney, Agent, or Firm—Young & Thompson

[57] ABSTRACT

Energizing system for a reluctance motor having at least two phases. A sensing and control circuit (1–5) which is constructed to indicate the inductance, or a clearly related magnitude, in the winding in the phase which is next to be energized or activated. The circuit is also constructed to detect the current in the winding in the energized phase and to correct the indicated value of the inductance, or related magnitude, with an operating parameter which has a dependency on the current value in the winding of the energized phase, and to compare this corrected value with a reference value and to utilize the rotational position of the motor rotor, when the corrected value coincides with the reference value, as a starting point for determining a rotational position for changing the energizing state of the phase winding.

6 Claims, 2 Drawing Sheets

MOTOR ENERGIZING CIRCUIT

The present invention relates to an energizing circuit for a reluctance motor.

BACKGROUND OF THE INVENTION

The most usual manner of controlling commutation from one phase to another in reluctance motors, particularly so-called switched-type drive motors, is to use at least one rotor sensor which is adapted to produce control signals that correspond to the rotational position of the rotor in relation to the stator. This is referred to below as the rotor position. This means, however, that an additional element must be mounted on the rotor, which in practice has been found to encumber a number of drawbacks and to give rise to errors, particularly in troublesome environments.

Brushless d.c. motors which operate with variable reluctance are well known to the art. The type of reluctance motor for which the invention is intended comprises a stator on which one or more excitation windings are arranged in one or more phases, with separate energizing or activation of the winding belonging to the respective phases. Both the stator and the rotor are normally provided with pronounced poles or teeth. The rotor has no winding. The stator and the rotor form a magnetic circuit for generating a mechanical torque which is substantially proportional to the square of the magnetomotive force of the excited or activated winding and to the permeance change time, which is a function of the movement of the rotor in the motor. Movement of the rotor relative to the stator generates a variation in the reluctance and therewith the permeance in the magnetic circuit of the stator winding.

Torque is only obtained in the drive direction of the motor when the magnetomotive force of the winding is maintained for a rotor position period in which the permeance increases with rotor movement. Consequently, it is desirable to hold each winding energized solely during one such period for this winding. For reasons pertaining to drive techniques it is convenient, although not fully necessary, to energize or activate solely one stator phase at a time, i.e. with no overlap between the phase energizations. Commutation from one phase to another can be effected so that each phase winding is energized or activated during a rotor position period in which the permeance increases with rotor position changes. The supply to each phase winding should be discontinued, or decreased, during each rotor position period in which the permeance decreases with rotor position change. As beforementioned, the most usual method in this regard is to use additional rotor sensors for sensing continuously the position of the rotor and controlling the energizing or power supply with the aid of a sensor-controlled circuit. There is a general desire, however, to find ways and means which will allow these rotor position sensors to be dispensed with. Consequently, several attempts have been made to utilize the variation of the current or voltage characteristics of the stator windings and surrounding circuits to provide an indication of suitable points of time at which the supply voltage can be switched on and off.

BRIEF DESCRIPTION OF THE PRIOR ART

In one known reluctance motor control system, described in U.S. Pat. No. 3,980,933, there is sensed the electro-motive force (EMF) which is induced in the stator winding when the rotor rotates and when the output from a switching device is non-conducting. The output of the switching device is made conductive when the EMF reaches a given level. A considerable bias current is required with this motor, in order to provide sufficiently wide margins. This results in power losses. Furthermore, since no energizing current is delivered to the winding during that time period in which the rotor position is sensed, it is not possible to load the motor to its maximum. Consequently, a driving or energizing current must be applied constantly to one of the phase windings. In order to be able to load the motor to its maximum, an energizing current must be provided at all times in some of the phase windings.

In the case of another reluctance motor control system, disclosed in U.S. Pat. No. 4,520,302, high frequency voltage pulses are supplied over the phase winding in that phase which is next in turn to be energized. The current rise time or current fall time in the winding is measured in order to provide an indication of the rotor position so as to obtain the correct commutating position. The reluctance motor control system described in this publication functions solely with stepping motors, in which the motor is rotated solely to desired positions of rotation. It will not function with drive motors which are intended to operate under widely varying loads.

SUMMARY OF THE INVENTION

The object of the present invention is to provide a reluctance motor control system for use with drive motors. This object is achieved by means of an inventive energizing circuit.

BRIEF DESCRIPTION OF THE FIGURES

The invention will now be described in more detail with reference to the accompanying drawings, in which.

DETAILED DESCRIPTION

Figure 1:
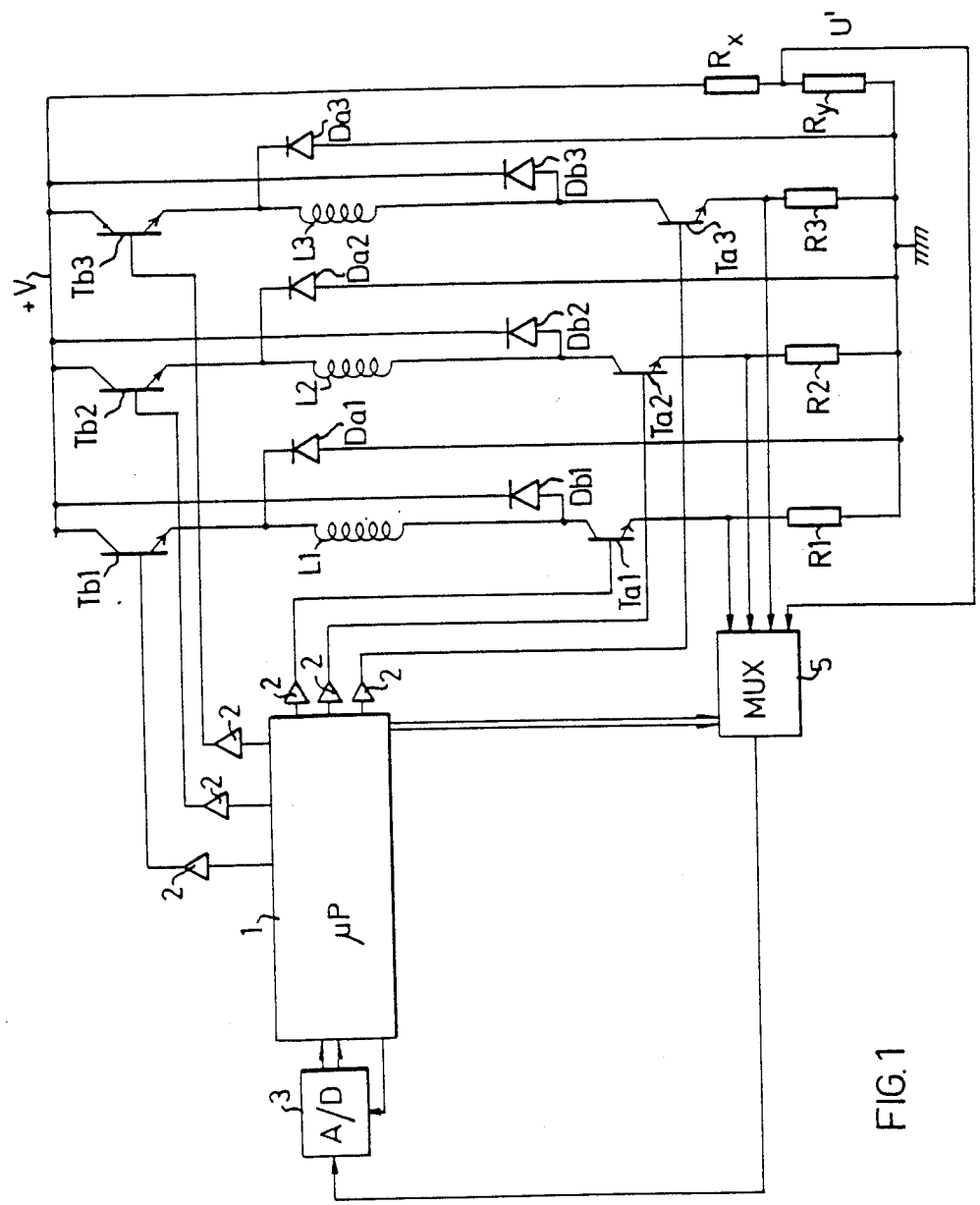
FIG. 1 is a circuit diagram which illustrates one embodiment of the control system according to the invention.

The circuit, or system, illustrated in FIG. 1 includes three phase windings L1, L2, L3 arranged on the stator of a three-phase reluctance motor. The invention is not restricted to the number of phases of the motor, and three phases have been shown solely by way of example. The motor is driven by a d.c. voltage $+V$, which may be 310 V for example, this voltage being a normal voltage for drive-type and switch-type reluctance motors. Between earth and the positive terminal of the voltage source, the phase winding L1 is incorporated in a circuit which comprises a current measuring resistance R1, the source-drain-path of a power transistor Ta1, the phase winding 1, and a power transistor Tb1. In this circuit, the lower transistor Ta1 is biassed during the whole time over which the phase winding L1 is to be excited or energized, whereas the upper transistor is pulsed during the phase energizing interval in the manner conventional with switched reluctance motors, where each phase energizing or drive pulse is divided into partial pulses. This division of the energizing pulse into partial pulses does not constitute part of the actual invention and will not therefore be described in detail. The anode of a diode Da1 is connected to ground and the cathode thereof is connected to the part of the phase winding L1 remote from the transistor Ta1, so as to maintain the current through the phase winding L1 during the whole of the energizing pulse interval. A diode Db1 is connected with the anode of the diode connected to the part of the phase winding L1 remote from the transistor Tb1 and the positive terminal, to provide a current circuit in which the phase winding L1 is rapidly drained of current as soon as the transistor Ta1 is switched off, i.e. blocked.

Each of the remaining phase windings L2 and L3 is connected in a similar respective circuit. Thus, the phase winding L2 is incorporated in a circuit which comprises a current measuring resistor R2, two power transistors Ta2, Tb2, and two diodes Da2, Db2, and the phase winding L3 is incorporated in a circuit comprising a current measuring resistor R3, two power transistors Ta3, Tb3 and two diodes Da3, Db3.

Switching of the transistors to their respective on and off modes is controlled by a control unit 1. This unit is preferably a microprocessor or microcomputer, although the unit may also consist of a circuit comprised of conventional circuit components. The control unit 1 has six outputs, each of which is connected to the gating means of their respective transistors Ta1, Ta2, Ta3, Tb1, Tb2, Tb3, via a respective amplifier 2, for the purpose of controlling each transistor individually.

The inductance of the phase next in turn to be excited is sensed in order to detect an inductance value relative to a certain rotor position at which commutation shall be effected for energizing of the phase.

Since normally no current flows in an unenergized or non-activated winding, high frequency pulses of short duration are fed from the control unit to the gating means of the power transistors in the energizing circuit of that winding which is next in line for excitation. The control unit 1 will, of course, also steer the power transistor at the same time to an energizing or power phase in a conventional manner. Each pulse has a given duration, T, which is short in relation to the time period, so that the current in the sensed winding has time to fall to zero between each pulse. The current is measured at the end of each pulse by an analogue/digital converter 3 connected to the control unit 1. The rise in current during the duration of each pulse gives an indication of the inductance in the sensed winding that prevails at that time T. Accordingly, each of three inputs of a multiplex unit 5 is connected through a respective one of the resistors R1, R2, R3, all of which have the same resistance. The fourth input of the multiplex unit will be described hereinafter. The multiplex unit 5 is controlled by the control unit 1 with a digital signal for stating which of the inputs of the multiplex unit shall be connected to its output.

In order to measure the current in the pulse phase which lies in turn to become energizing, the control unit 1 instructs the multiplex unit to supply the voltage across the resistor R1, R2, R3 which belongs to the phase circuit in turn to be the driving circuit next to the input of the analogue/digital converter 3. In addition hereto the multiplex unit 5 is steered to carry out further functions in a manner hereinafter described.

The control unit 1 determines the inductance by approximating the equation $(U-Ri)=d/d\tau(L.i)$ with $U=L.di/d\tau$, which is a good approximation for small currents i and low speeds, i.e. low $dL/d\tau$.

The U.S. Pat. No. 4,520,302 mentioned in the introduction describes one such system which measures the time of current changes in a non-energizing phase, which in practice involves measuring the inductance in this phase. Consequently, according to this published patent specification, commutation is effected when the inductance in the phase on which the measurement is carried out has reached a predetermined value.

It is assumed in the known control system that the supply voltage is constant. In practice the supply voltage V can often very quite widely, due to normal variations in voltage and also to the voltage ripple obtained when $+V$ is a rectified a.c. voltage.

The inductance of a phase is highly dependent on the current in said phase. In present day reluctance motors, parts of the iron circuit are mostly common to the various phases. Saturation, and therewith reduced inductance in a phase (see FIG. 2), consequently results in partial saturation and therewith reduced inductance also in remaining phases.

Figure 2:
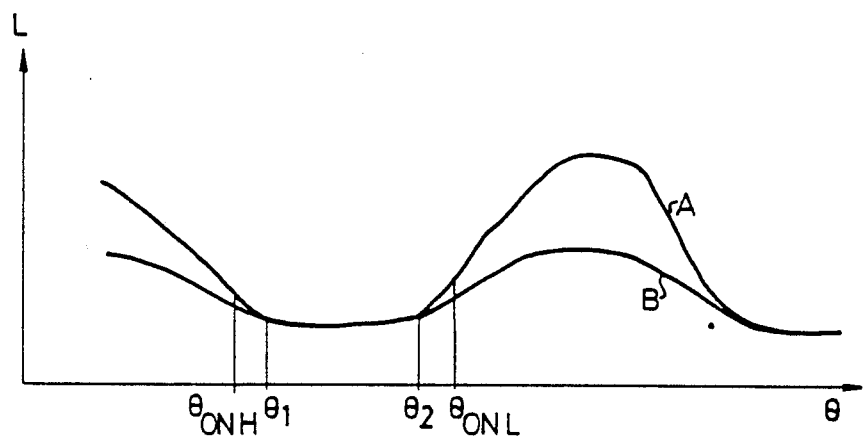
FIG. 2 is a diagram which illustrates the manner of operation of the invention.

The current in the winding of an energized phase increases with increasing load, which causes the variation of inductance in the winding to decrease with increasing loads. FIG. 2 illustrates the inductance L as a function of the rotational position $\theta$ for two mutually different loads, the curve A being obtained with a low load, i.e. a relatively low value of the current i in the energized phase, and the curve B being obtained at relatively high loads, i.e. a high energizing current. Since the iron circuit is common to the phases, similar variations in inductance in the windings is obtained in all phases, irrespective of whether these phases are energized or not.

The inductance in a non-energized phase is also dependent on the current strength in an energized phase. The control circuit described in U.S. Pat. No. 4,520,302 takes no account of inductance variations due to current level, which makes it difficult to drive the motor described in said publication at different loads.

Consequently, in accordance with the invention a compensation is made both for varying supply voltage $+V$ and for varying current in the energized winding. A voltage divider having two series-connected resistors $R_x$ and $R_y$ is connected between the positive terminal at $+V$ on the voltage source and earth. The $R_x$, $R_y$ outputs of the voltage divider are connected to a fourth input of the multiplex unit 5. The voltage U' measured across $R_y$ is therewith proportional to $+V$.

With each short pulse to the monitored winding, the control unit 1 will now cause the multiplex unit 5 to transfer the voltage in a selected sequence over the measuring resistor R1, R2 or R3 in a monitored phase, the voltage over the measuring resistor R1, R2 or R3 in an energized phase, and the voltage U' over the resistor $R_y$ to the output of the multiplex unit 5.

The control unit 1 thus indicates the momentary current at the end of each pulse of short duration to the monitored winding in a non-energized phase, by supplying a sample pulse to the control input of the analogue/digital converter 3 at the end of the pulse. In conjunction herewith, i.e. immediately prior or immediately subsequent thereto, the current in the energized phase and the voltage U' are also indicated, by sampling the multiplex unit 5 and the analogue/digital converter 11 at appropriate times. The control unit 1 receives on its inputs connected to the analogue/digital converter 3 signals which are in known proportions to the signals to be measured.

Allowance shall be made for the current in the energized phase and for the momentary supply voltage. This compensation can be effected substantially in two ways.

The first is to add a compensating rotor angle which becomes smaller with increasing current in the energized phase. This type of compensation is difficult to effect right down to a stationary motor. The second, and preferred manner is to compensate the indicated inductance.

In order to obtain with this second, preferred method of compensation a rotor position point $\theta_{OFF}$, for interrupting supply to an energized phase and commuting the energization to the next phase, which rotor position point for a selected rotor speed will thus be as constant as possible, the momentary inductance or a value proportional thereto is determined and the inductance value thus obtained compensated.

The function $L_a(\theta, i_b)$, i.e. the inductance in a phase a as a function of the current in a phase b is non-linear with $i_b$. A good approximation for most types of reluctance motor is most often $$L_a(\theta_c, 0)/L_b(\theta_c, i_b) = (1 + c \cdot i_b)$$

where the constant c is determined individually for each motor, so as to maintain $\theta_{OFF}$ constant. $\theta_{OFF}$ is preferably made equal to $\theta_c$. Naturally, this is done under the proviso that the inductance is compensated in the aforedescribed manner. The commutation condition to be fulfilled when compensating the inductance for both the momentary supply voltage level and the energizing current level is thus $$L = L_c \text{ or } (1 + c \cdot i_b) \cdot U \cdot T/i = L_c$$

This enables a purely static commutation to be achieved irrespective of the current strength in the energized phase and the supply voltage.

Static commutation which is independent of rotor rotation as before described can also be achieved, provided that the rotor speed is low. Firstly it is necessary that the approximation $d/d\tau(L \cdot i) = L \cdot di/d\tau$ applies (i.e. $idL/d\tau < Ldi/d\tau$, and secondly the frequency of the inductance-sensing pulses is higher than the commutating frequency of the motor, since this frequency determines the time resolution in the commutating process.

In practice these limitations merely signify that the motor may be operated to between 20% and 50% of its maximum speed, depending on the construction of the motor, when applying this commutating method. At speeds which lie beneath this limit, however, there is obtained a function which corresponds completely to the function obtained with From a control aspect, it is simplest to drive each phase individually, with commutation between the phases in the absence of overlap. Naturally, each phase winding may be energized individually in a manner to optionally obtain overlap between the phases, so that two phases are energized simultaneously during given intervals. However, when it is not desired to have an overlap between the phases, but to commutate at the rotation angle $\theta_{OFF}$ from one phase to another, $\theta_{ON}$ will be displaced within the rotor angular range in the same manner as $\theta_{OFF}$.

When driving a reluctance motor in accordance with the invention, it may be convenient in the case of extremely low speeds to energize the phase at the beginning of the rising part of the L-curve at $\theta_{ONL}$, but in the case of a higher speed, and particularly when the speed approaches 20% to 50% of the maximum speed, it may be suitable, in order to obtain a good driving effect, to move the rotational position $\theta_{ON}$ for phase activation more to the left, i.e. to $\theta_{ONH}$, so that activation is effected on the negative flank of the inductance curve immediately prior to the region of extremely low inductance. This will provide improved and smoother functioning of the motor. Displacement of the activation point $\theta_{ON}$ from a location on the rising flank of the inductance curve to a location on the falling flank can be effected continuously. However, it is difficult to detect inductance differences during the essentially straight part of the curve, i.e. between $\theta_1$ and $\theta_2$ of an induction curve of very low conductance, and consequently it is preferred to move $\theta_{ON}$ continuously during the rising and falling parts of the inductance curve and to effect stepwise movement between these locations. The activation point can also be moved stepwise in a multiple of steps. The significance of being able to move this point becomes greater with a decreasing number of phases. This displacement possibility consequently has its greatest significance in motor which comprise two or three phases. In order to obtain this possibility the control unit 1 must calculate the slope off the L-curve, i.e. must compare successively indicated inductance values with one another in order to obtain the sign of the change in inductance.

Consequently, the control unit 1 is suitably provided with a programme in which the inductance value and the sign of the inductance change for indicating $\theta_{ON}$ are different for different rotational speeds or speed ranges within the low speed range.

Various modifications are possible within the scope of the invention.

We claim:

1. An energizing system for a reluctance motor comprising
   (a) a stator including at least one winding for at least two phases;
   (b) a rotor cooperating with a magnetic circuit in each stator phase to produce a permeance which changes with the rotor angle while said rotor rotates; and
   (c) sensing and control means connected with said stator for indicating the inductance in the winding for a phase next in turn to be activated, for detecting the current in the winding of the energized phase, and for calculating a correction factor depending upon the current value in the winding of the energized phase, said sensing and control means correcting the inductance in accordance with the calculated correction factor, whereby the inductance corresponds with the rotational angle of said rotor irrespective of the current strength in the activated phase.

2. An energizing system as defined in claim 1, wherein said sensing and control means detects the momentary supply voltage level and corrects the indicated value of the inductance with a factor which is dependent on the momentary supply voltage level.

3. An energizing system as defined in claim 1, wherein said sensing and control means supplies voltage pulses of short duration over the phase winding in the phase which is next activated and measures for each pulse the current level ($i_a$) in said phase winding at the end of the pulse duration time (t), measures the current ($i_b$) in the phase winding in the energized phase and measures the supply voltage (U') when measuring the current level ($i_a$); said sensing and control means calculating the inductance L at each measuring moment in accordance with the equation $$L = (1+c \cdot i_b)U' \cdot t/i_a$$

where c is a constant which is dependent on the motor concerned, said sensing and control means comparing the calculated inductance with an inductance value $L_c$ for which commutation is to be effected within an interval having a pre-determined inclination of a curve over the inductance as a function of the rotation angle ($\theta$).

4. An energizing system as defined in claim 1, wherein said sensing and control means calculates the motor speed and determines a value of the rotational position from this calculation, to which energizing of the monitored phase shall be made, the determination of the rotational position being made in that this position, in accordance with the calculated value of the motor speed, is represented by a positive or negative flank of the inductance curve together with notation of prescription for the position of an energizing start time on the flank of the actual inductance curve for the actual speed.

5. An energizing system as defined in claim 1, wherein the rotor position is represented by a positive flank of an inductance curve at a very low motor speed and by a negative flank of the inductance curve at motor speeds which lie relatively close to 20%–50% of the maximum motor speed.

6. An energizing system as defined in claim 3, wherein said reference value is changed stepwise.

* * * * *